MEANS TO ELIMINATE REDUNDANT INFORMATION

Filed May 6, 1964

INVENTOR
HYMAN HURVITZ

BY Hurvitz & Rose

ATTORNEYS

United States Patent Office 3,405,238

Patented Oct. 8, 1968

3,405,238

MEANS TO ELIMINATE REDUNDANT INFORMATION

Hyman Hurvitz, 822 Warner Building, Washington, D.C. 20004

Filed May 6, 1964, Ser. No. 365,419
1 Claim. (Cl. 179—100.2)

ABSTRACT OF THE DISCLOSURE

A system for re-recording less than all of plural pre-recorded identical frames separated by blank spaces greater than the frame lengths, and leaving between each pair of re-recorded frames a predetermined small space occupied by a control signal. Two readout heads are provided in a first reproducer, which reads out the pre-recorded tape, one of which is a readout head and the other a control head. These are so positioned that the control head senses the initial point of a frame ½ second before the other readout head senses the frame. The control head operates a ring counter, arranged to control tape feed of a recorder. The counter causes tape feed of the recorder only at one or two of its positions and disables tape feed for all other counts. The counter has a number of counts per cycle of operations equal to the total number identical frames on the pre-recorded tape. While the control head is sensing signal and the readout head not sensing signal a control signal is recorded on the final tape.

The present invention relates generally to re-record systems for langauge laboratories, and more particularly to systems for converting standard langauge laboratory tapes employing multiple frame repetitions, to forms suitable for utilization in unconventional equipment.

This application for U.S. patent, and an application for U.S. patent of James N. Cooper, Ser. No. 317,840, now U.S. Patent 3,234,666, filed Oct. 21, 1963, and entitled "Teaching Machine," are assigned to a common assignee. In the Cooper application a language teaching magnetic tape recorder is disclosed which utilizes pre-recorded tape in which each item consists of either one or two repetitions of a frame, such as a word or phrase, or sentence, in a language as recorded by a master of the language. A one-half second space is required to intervene between frames in the Cooper machine. Conventional master tapes may include, for example, five repetitions of each frame, each frame followed by a blank space of one and one-half times the duration of the preceding frame, the blank space being used for student recording.

Large libraries of conventional language training tapes exist, which are useless for direct use in the Cooper system. It is therefore desirable that equipment be available for automatically and rapidly converting the conventional tapes to tapes useful in the Cooper system.

It is an object of the present invention to provide a system for converting language tapes of one type of language tapes of another type, by means of automatic equipment.

A preferred embodiment of the invention is illustrated in the accompanying drawings, wherein.

Figure 1:
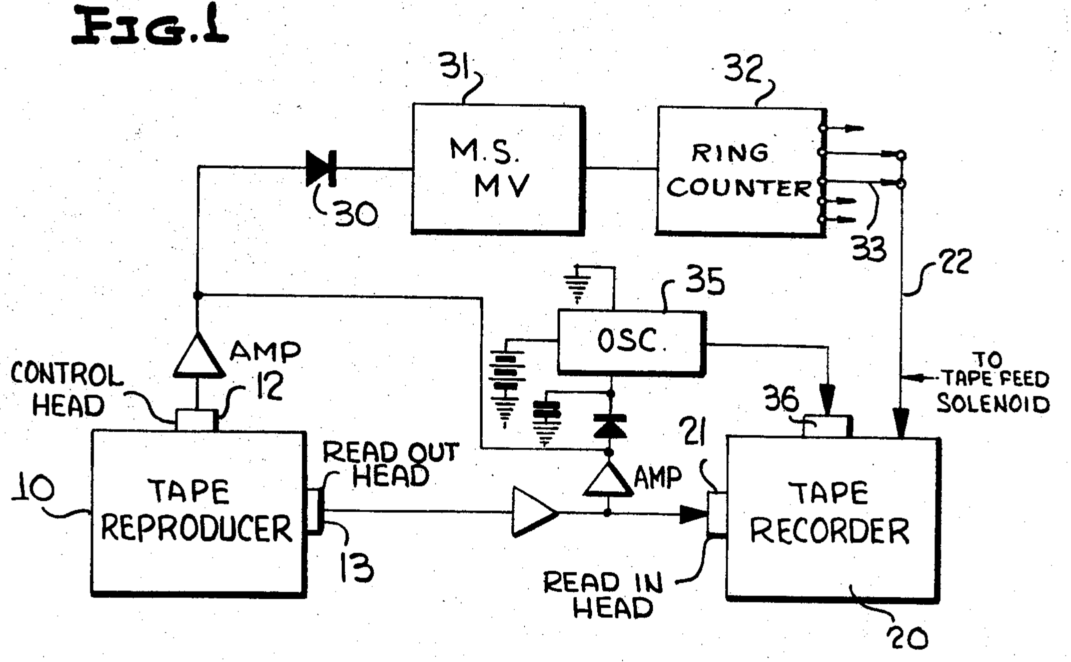
FIGURE 1 is a clock diagram of a system according to the invention.
Figure 2:
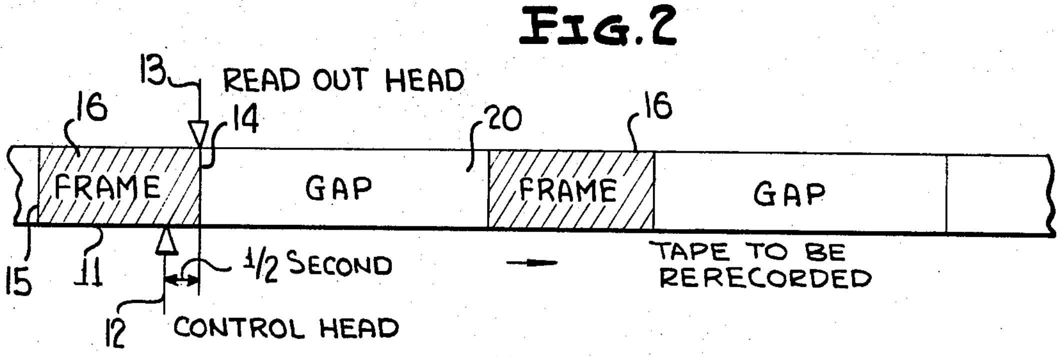
FIGURE 2 is a view in plan of a conventional tape.

Referring now to the drawings, 10 is a tape reproducer, having therein a tape 11 recorded as in FIGURE 2, i.e. in multiple frames having large random length gaps therebetween and having readout heads 12, 13 positioned as in FIGURE 2, i.e. with head 13 used for reading out the recorded signals at the beginning 14 and the end 15 of each frame 16 on the tape, while head 12 reads out the content of the frames, but is positioned ½ second upstream of head 13.

20 is a tape recorder having a single record head 21 and a solenoid control lead 22, which when energized actuates a tape feed control solenoid (not shown).

Figure 3:
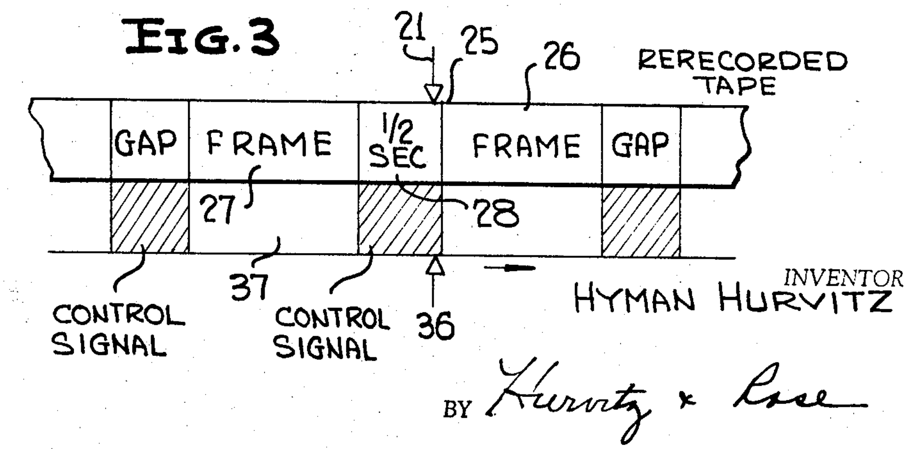
FIGURE 3 is a view in plan of a Cooper type tape.

Read-out head 13 and read in head 21 are always interconnected. Tape 11 is fed continuously, but tape 25 (FIGURE 3) feeds when control signal is present on lead 22. The ultimately recorded tape 25 of FIGURE 3 is to contain a predetermined number, usually one or two, of frames 26, 27, separated always by ½ second gaps as 28. The frames as 26, 27 may be of variable length. The gaps 29 on tape 11 each follows a frame, as 16, and the gaps are 1½ times as long as the frames, which themselves are of random lengths for different sets of frames, but more or less identical within each set of frames. It is assumed that five frames per set occur on tape 11, in order to provide a specific example.

The control head 12 provides an AC signal while reading out a frame 11, but not while reading out a gap 29. The AC signal is rectified by diode 30, to provide "on" signal to a monostable multivibrator 31. The head 13 also supplies signal to diode 30. It follows that when head 12 picks up a control signal in a frame 16, multivibrator 31 switches states, and holds the state until after the frame is finished, in respect to readout by head 13. Multi-vibrator 31 makes instantaneously but may have a long time constant to prevent operation due to inter-syllabic or inter-word pauses, and thus to assure frame completion, say 1/10 second (or 1/20 second).

When turned on, the multivibrator 31 steps counter 32 one step. The counter 32 is a ring counter, having five places, for the cited example, and signal output leads, 33, 34 may be provided for one or two of these places only. Two are illustrated. If the counter 32 is stepped to a position not corresponding to one of leads 33, 34 tape recorder lead 22 receives no signal, whereupon tape 11 continues to feed, but tape 25 remains stationary. If the counter position attains either lead 32 or 33, which it does for certain of the frames 16, a signal is supplied by the counter stage to tape recorder 20 via lead 22, to press its tape against its capstan; whereupon tape feed of tape 25 commences. After about ½ second of blank time, provided by the spacing between heads 12 and 13 and multivibrator 31, information commences to feed in to head 21, since at this time head 12 is at the initial point of a frame, as 26 or 27. The latter head now maintains control signal to multivibrator 31 until it completes its readout.

When head 13 no longer sees a signal, head 13 is precisely at the end of its frame. But the time constant of multivibrator 31 is 1/10 second, so that the tape feed solenoid of recorder 20 holds in until readout of the information of the frame is surely completed, after which multivibrator 31 changes state, which forces counter 32 to change state and de-energize the solenoid of recorder 20, and rendering the counter 32 ready for a succeeding count, and the counter 32 remains in that state during readout of gap 29.

It follows that, if five frames and five gaps exist on tape 11, only two frames will be read into recorder 20, and that the lengths of gaps 29 which are non-uniform, and which may be as much as 10 seconds long, will be converted to about ½ second gaps, regardless of the length of frames 26.

Times referred to hereinbefore refer to tape feed rate selected for normal speed voice readout, and will be reduced if the tapes are operated at high speed to reduce copying time.

While the head 13 is reading out it biases off a normally running oscillator 35 say of 1000 c.p.s. rate, which records via head 36 on track 37 at gaps 28 to provide interframe control signals, which are needed in the Cooper system, provides a time constant intersyllabic to prevent dropout of oscillator 35.

While I have described and illustrated one specific embodiment of my invention, it will be clear that variations of the details of construction which are specifically illustrated and described may be resorted to without departing from the true spirit and scope of the invention as defined in the appended claim.

What is claimed is:

1. A system for re-recording from first tape having recorded thereon multiple frames of random lengths separated in pairs by relatively large gaps greater than frame length to a second tape in terms of frames followed by gaps all of the same fixed predetermined length, comprising a control readout head and an information readout head arranged to read out said first tape, said control readout head preceding said information readout head along said first tape by a gap equivalent to said gap of fixed predetermined length, and means for feeding said second tape substantially only while one of said frames of random length is being read out by said information readout head plus the duration of said gap of fixed predetermined length and in response to readout of said selected one of said frames, wherein is further provided means including a ring counter responsive to said multiple frames for selecting only predetremined ones thereof fewer than all thereof, and wherein said last mentioned means includes a multivibrator responsive to each discrete signal from said control readout head for actuating said ring counter one step, wherein said ring counter has a total count capability equal to the number of said multiple of frames and a lesser number of output leads, and wherein said lesser number of output leads are jointly connected to said means for feeding said second tape.

References Cited

UNITED STATES PATENTS 3,286,273 11/1966 Von Kohorn ------ 179—100.2

BERNARD KONICK, *Primary Examiner.*

V. P. CANNEY, *Assistant Examiner.*